(12) United States Patent
Anderson et al.

(10) Patent No.: US 9,552,526 B2
(45) Date of Patent: Jan. 24, 2017

(54) IMAGE PROCESSING USING CELLULAR SIMULTANEOUS RECURRENT NETWORK

(71) Applicant: The University of Memphis Research Foundation, Memphis, TN (US)

(72) Inventors: John K. Anderson, Jackson, TN (US); Khan M. Iftekharuddin, Virginia Beach, VA (US)

(73) Assignee: University of Memphis Research Foundation, Memphis, TN (US)

( * ) Notice: Subject to any disclaimer, the term of this patent is extended or adjusted under 35 U.S.C. 154(b) by 0 days.

(21) Appl. No.: 14/571,463

(22) Filed: Dec. 16, 2014

(65) Prior Publication Data

US 2015/0227802 A1 Aug. 13, 2015

Related U.S. Application Data

(60) Provisional application No. 61/918,360, filed on Dec. 19, 2013.

(51) Int. Cl.
*G06K 9/00* (2006.01)
*G06K 9/66* (2006.01)
*G06N 3/04* (2006.01)

(52) U.S. Cl.
CPC ....... *G06K 9/00979* (2013.01); *G06K 9/00288* (2013.01); *G06N 3/04* (2013.01); *G06N 3/0445* (2013.01)

(58) Field of Classification Search
CPC .. G06K 9/00979; G06K 9/66; G06K 9/00288; G06N 3/08; G06N 3/04; G06N 3/0445

USPC ................................................. 382/157, 158
See application file for complete search history.

(56) References Cited

U.S. PATENT DOCUMENTS

2009/0299929 A1* 12/2009 Kozma ................ G06N 3/0454
706/25

OTHER PUBLICATIONS

Anderson et al. "Binary Image Registration using Cellular Simultaneous Recurrent Networks." IEEE Symposium on Computational Intelligence for Multimedia Signal and Vision Processing, Mar. 30, 2009, pp. 61-67.*

* cited by examiner

*Primary Examiner* — Jon Chang
(74) *Attorney, Agent, or Firm* — Mintz Levin Cohn Ferris Glovsky and Popeo, P.C.; Peter F. Corless; Carolina E. Säve

(57) ABSTRACT

A method of image processing using a cellular simultaneous recurrent network (CSRN) is provided. In particular, the method includes a processor that sets initial parameters of the CSRN and generates a target image based on the initial parameters. Then, a training process is executed to learn an image processing task. The training process performs an image processing task on one of a plurality of sub-images of an input image and then the sub-image is stored after the training process. The training process is then repeated until the image processing task has been performed on each of the plurality of sub-images of the input image. Once the training process is complete, an image transformation is performed on the input image and an output image is displayed based on the transformed input image.

22 Claims, 13 Drawing Sheets

1) RANDOMLY SELECT A SET OF INITIAL WEIGHTS, W.

2) COMPUTE AN INITIAL COVARIANCE MATRIX, K.

3) FOR EACH EPOCH

4) FOR EACH TRAINING IMAGE

5) COMPUTE THE OUTPUT OF THE NETWORK

6) COMPUTE THE INNOVATION. (THE ERROR BETWEEN THE TARGET OUTPUT AND NETWORK OUTPUT.)

7) UTILIZE BPTT TO COMPUTE THE JACOBIAN.

8) ADD A ROW TO THE JACOBIAN.

9) ADAPT WEIGHTS USING THE EKF EQUATIONS.

FIG. 8A

1) RANDOMLY SELECT A SET OF INITIAL WEIGHTS, $w_0$ AND SET $w_{k-1} = w_0$

2) COMPUTE AN INITIAL COVARIANCE MATRIX $P_0^w$ AND SET $P_{k-1}^w = P_0^w$

3) FOR EACH EPOCH

4) FOR EACH TRAINING IMAGE

5) PERFORM THE PREDICATION STEP.

6) SELECT SIGMA POINTS.

7) COMPUTE SIGMA POINT WEIGHTS.

8) PERFORM THE MEASUREMENT UPDATE, i.e. COMPUTE THE FORWARD COMPUTATION OF THE CSRN.

9) COMPUTE THE STATISTICS FOR THE UPDATE.

10) COMPUTE THE KALMAN GAIN.

11) PERFORM THE ESTIMATION UPDATE.

FIG. 8B

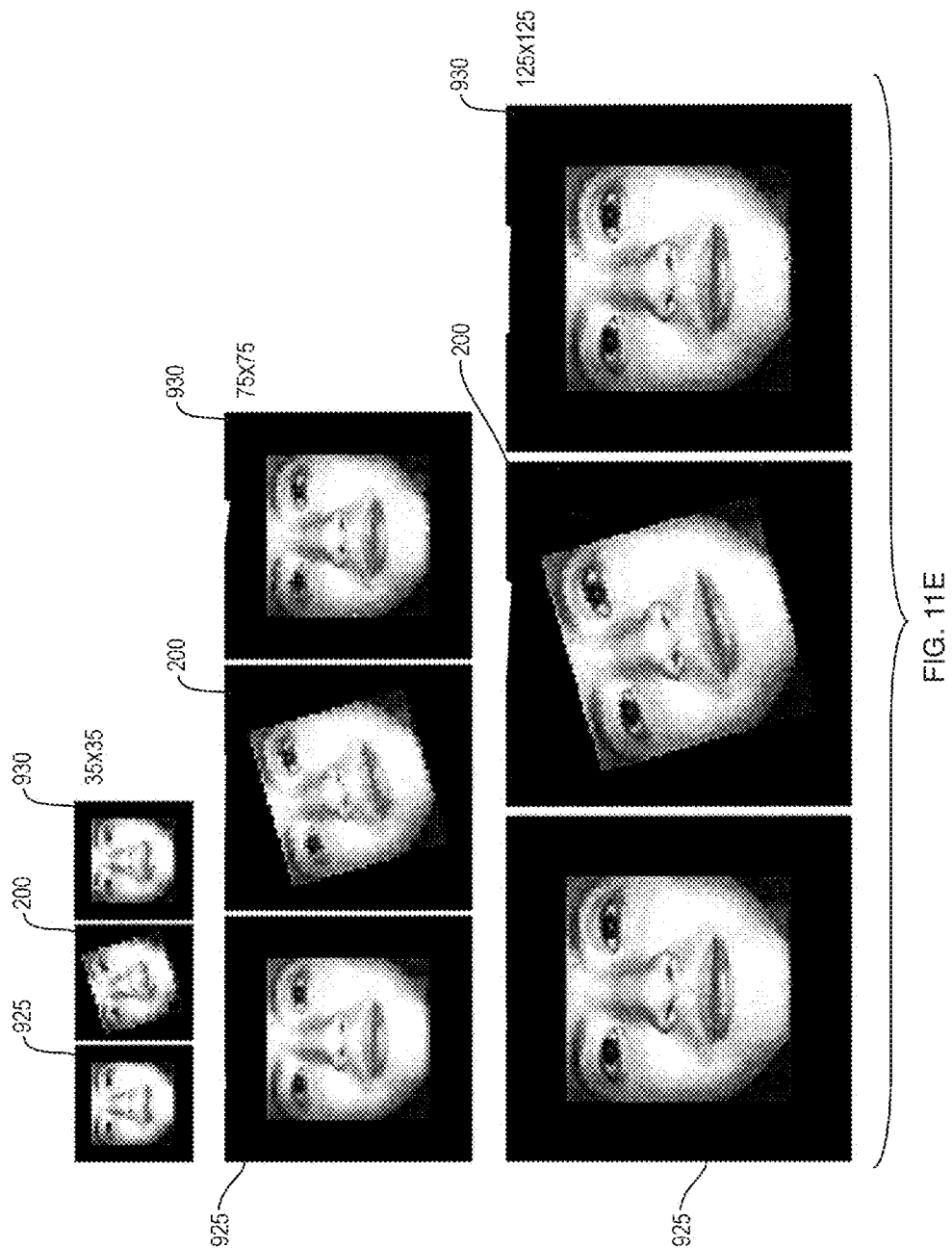

IMAGE PROCESSING USING CELLULAR SIMULTANEOUS RECURRENT NETWORK

CROSS REFERENCE TO RELATED APPLICATION

This application claims priority to and the benefit of U.S. Patent Application No. 61/918,360 filed in the United States Patent and Trademark Office on Dec. 19, 2013, the entire contents of which are incorporated herein by reference.

BACKGROUND

1. Field of the Invention

The present invention relates to an image processing method and, more particular, relates to an image processing method using a cellular simultaneous recurrent network.

2. Description of the Related Art

As is known, feed-forward neural networks are unable to process data with time dependent information and are thus impractical for image processing and handling data in typical images. Cellular neural networks have been used for performing image processing tasks and are capable of performing fractional and single pixel translation. However, cellular neural networks have shown limited success with geometric transformations and image registration. Further, known methods of cellular neural network imaging processing in the related art typically compute weights mathematically and not through a learning process. Methods that utilize back-propagation to train cellular neural networks to perform imaging tasks such as loss-less image coding and modeling mechanical vibration have been recently developed. However, the known methods of imaging processing using cellular neural networks are not capable of learning to perform image processing tasks such as geometric transformations.

Moreover, cellular simultaneous recurrent networks were developed for both long-term optimization and learning. These networks have been developed to show that neural networks may be applied to image optimization. For example, FIG. 1 shows a cellular structure of the cellular simultaneous recurrent network for image processing. As shown in FIG. 1, each cell structure includes a plurality of cells 100 which each contain a core network. Notably, there is a one-to-one correspondence between the input image 105, each cell 100, and the output image 110.

SUMMARY

In an exemplary embodiment of the present invention that processes images using a cellular simultaneous recurrent network (CSRN), a processor may be configured to set one or more initial parameters of the CSRN and then based on the one or more initial parameters the processor may generate a target image. Once the target image is generated, a training process may be executed to learn an imaging processing task. The training process may perform an imaging processing task on one of a plurality of sub-images of an input image. The plurality of sub-images of the input image may then be stored and the training process may be repeated until the image processing task has been performed on each of the plurality of sub-images of the input image. Once the training process is complete, an image transformation may be performed on the input image and the image transformation of the input image may be displayed as an output image.

In particular, the training process may include creating a CSRN object by setting one or more random initial weights and then performing a training loop, a testing loop, and a result loop based on the CSRN object. The training loop may include forwarding a computation of the CSRN, computing a training method type, and updating the one or more weight parameters. The training loop may be performed for each of the plurality of sub-images of the input image. In addition, the testing loop may include forwarding a computation of the CSRN and selecting a best generalizing net. The testing loop may also be performed for each of the plurality of sub-images of the input image. The result loop may include forwarding a computation of the CSRN and transforming one of the plurality of sub-images. In response to transforming one of the plurality of sub-images, the statistics of one of the plurality of sub-images may be computed and the result loop may be performed for each of the plurality of sub-images of the input image.

The one or more parameters of the network may selected from one or more of a group consisting of a number and type of external inputs, a number of pixels from the input image, a number and type of outputs for the network, a core network type, a number of core iterations, a number of neighbor inputs, a number of self-recurrent inputs, a number of active neurons, and a training method type. The core network type may be selected from a group consisting of a generalized multi-layered perceptron, an Elman simultaneous recurrent network, and Elman simultaneous recurrent network with multi-layered feedback. In addition, the training method type may be selected from a group consisting of an extended Kalman Filter (EKF) and an Unscented Kalman Filter (UKF).

The EKF may be an algorithm that may include randomly selecting a set of one or more initial weights, computing an initial covariance matrix for each of the plurality of sub-images, computing an error between a target output and the network output, computing a Jacobian matrix, and adding a row to the Jacobian matrix. Then, the weights of the network may be adapted using EKF equations. In addition, the UKF may be an algorithm that may include randomly selecting a set of one or more initial weights, computing an initial covariance matrix, performing a prediction step for each of the plurality of sub-images, selecting a plurality of sigma points, computing one or more sigma point weights based on the selected sigma points, performing a measurement update by computing a forward computation of the CSRN, computing the statistics of the measurement update, and computing a Kalman gain based on the computed statistics. Then, an estimate update may be performed based on the Kalman gain.

BRIEF DESCRIPTION OF THE DRAWINGS

The embodiments herein may be better understood by referring to the following description in conjunction with the accompanying drawings in which like reference numerals indicate identically or functionally similar element, of which:

FIGS. 8A-8B show exemplary algorithms of the training method types according to an exemplary embodiment of the present invention;

FIGS. 11A-11E show exemplary views of affine transformation according to an exemplary embodiment of the present invention;

DETAILED DESCRIPTION

Figure 1:
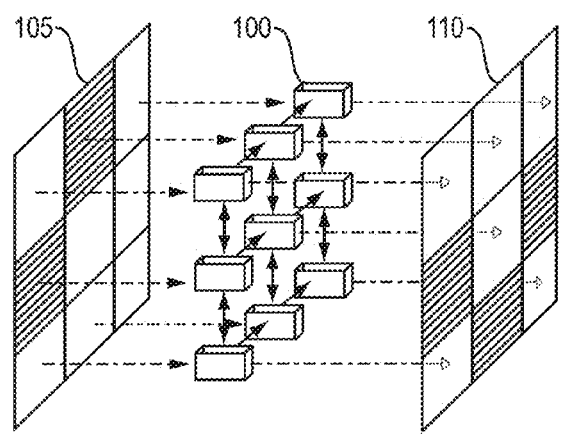
FIG. 1 shows an exemplary view of a cellular simultaneous recurrent network for image processing according to the related art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

A storage device is understood to refer to any medium capable of storing processes or data, in any form, and may for example include hard drives, memory, smart cards, flash drives, etc. The memory is configured to store the modules and the processor is specifically configured to execute said modules to perform one or more processes which are described further below.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

An exemplary embodiment herein provides an image processing method that utilizes a cellular simultaneous recurrent network. The image processor of the present invention may learn to perform basic image processing tasks as well as more complex tasks involved in geometric transformation. Conventional cellular neural networks (CNN) have shown limited success with geometric transformations (e.g., affine transformations and image registration). Specifically, conventional CNN's compute weight values mathematically and are fixed based on goals of application as opposed to computing the weight values through a learning process. Thus, the conventional CNN's used for imaging processing may not be capable of performing more complex imaging processing tasks and may show a higher rate of error for basic image processing tasks.

Therefore, in an exemplary embodiment of the present invention, an image processor may set one or more initial parameters of a CSRN and based on those parameters, may generate a target image. In addition, the image processor may execute a training process to learn an image processing task. Particularly, the training process may perform an imaging processing task on one of a plurality of sub-images of an input image and then store the one of the plurality of sub-images on a storage device. The training process may be performed until the image processing task has been performed on each of the plurality of sub-images and then an image transformation may be performed on the input image. Further, an output image may then be displayed based on the image transformation of the input image.

Figure 2:
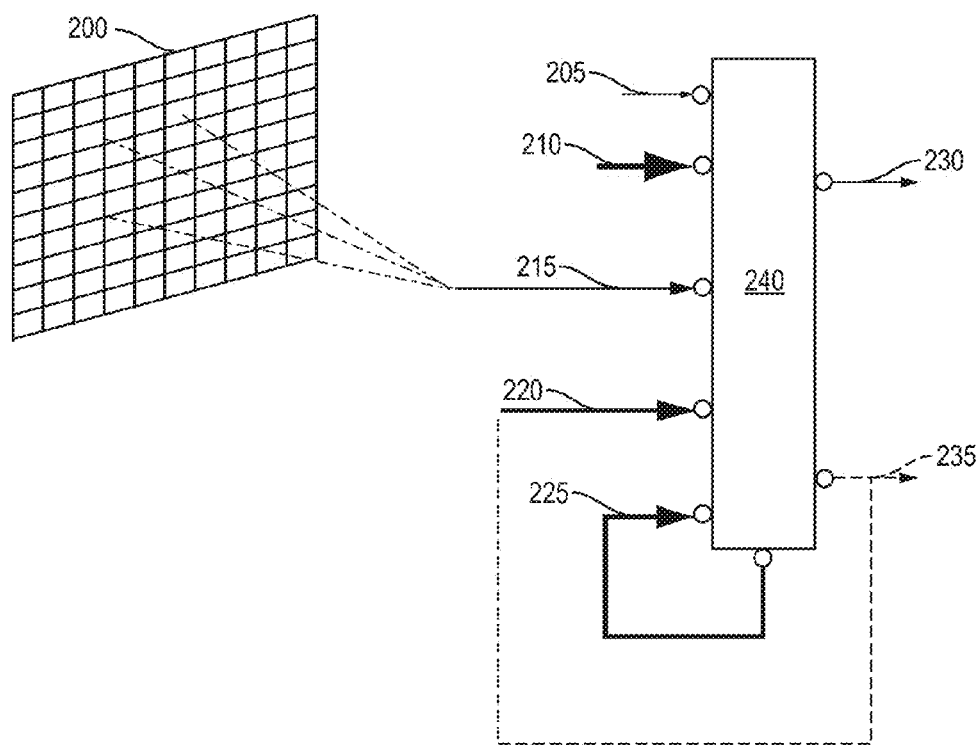
FIG. 2 shows an exemplary view of the cell configuration for the cellular simultaneous recurrent network according to an exemplary embodiment of the present invention.

FIG. 2 shows a generalized configuration of a CSRN that is used for the image processing. In particular, FIG. 2 shows that a variable number of external inputs 210 may be used to allow the network to learn a variety of specific parameters. The configuration includes a CSRN core 240 that provides computational ability to the network due to the increased number of active neurons and increased recurrency. In addition, FIG. 2 shows neighbor inputs 220 (e.g., 8 inputs) and which allow the CSRN to pre-filter the input pixels. The outputs from a cell's neighboring cells (e.g., 4 or 8) provide increased resolution for local computations. In addition, weight sharing between the cells may allow a reduction in required resources and computational load of the network.

Figure 3:
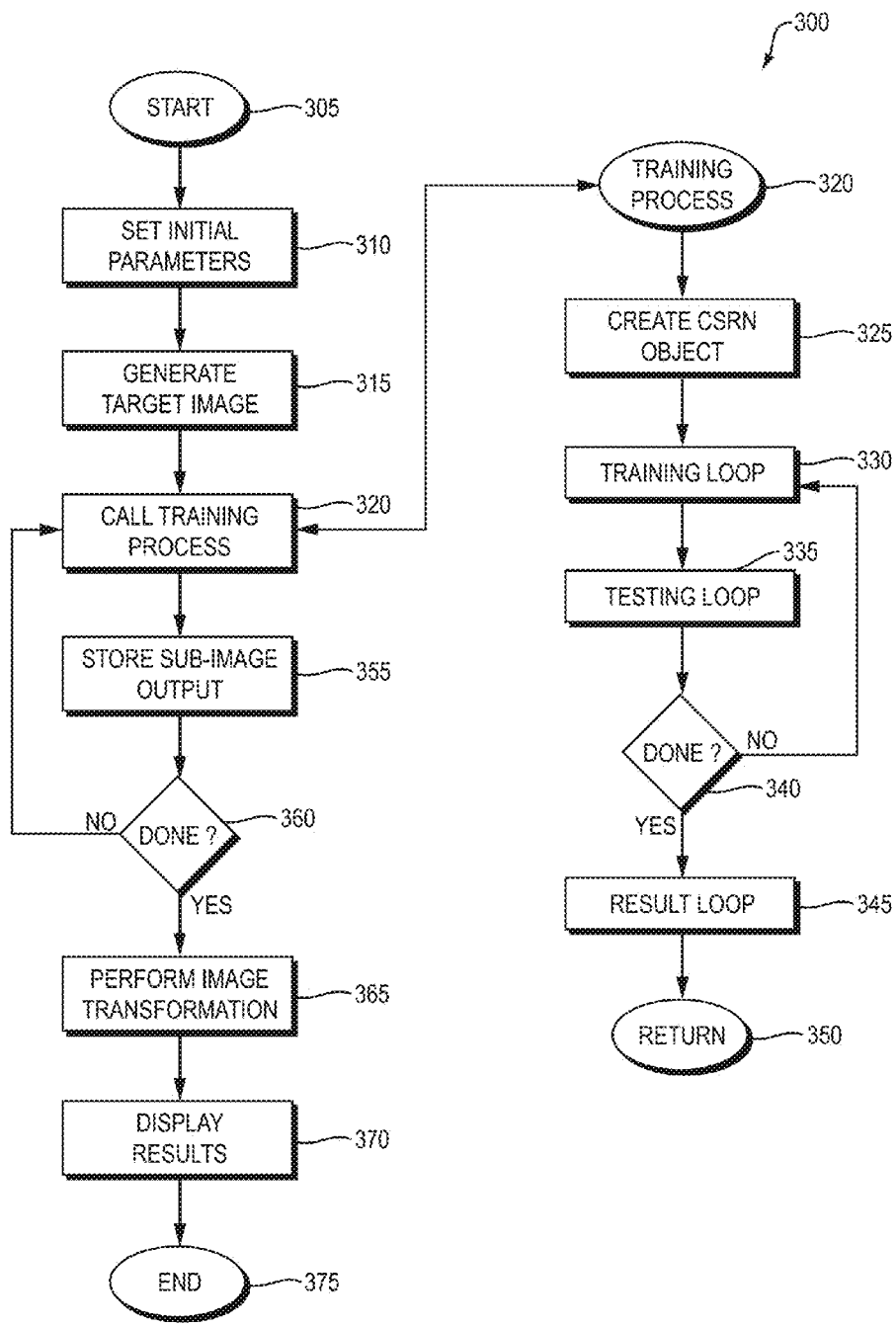
FIG. 3 shows an exemplary flowchart a cellular simultaneous recurrent network algorithm according to an exemplary embodiment of the present invention.

In particular, FIG. 3 illustrates an exemplary simplified procedure 300 as executed by a processor for image processing. The procedure may start at step 305 and continues to step 310, where a plurality of initial parameters are set and based on the parameters a target image (e.g., a training image) may be set in step 315. A training process may then be executed in step 320 to learn an imaging processing task that performs an image processing task on one of a plurality of sub-images of an input image 200. Specifically, the training process of step 320 creates, in step 325, a CSRN object by setting a plurality of random initial weights. Then in step 330, a training loop based on the CSRN object may be performed, followed by, in step 335, a testing loop. The testing loop may be repeated in step 340 until the image processing task has been learned. Then, once the image processing task has been learned, a result loop may be performed in step 345 and in step 350 the process may return to the image processing method wherein in step 355, the sub-image of the input image 200 may be stored. The training process may be executed until each of the sub-images of the input image 200 has completed the training process. Thereafter, in response to determining, in step 360, that each sub-image has been completed, an image transformation may be performed on the input image 200 in step 365. An output image 930 may be displayed subsequently in step 370 as an output image 930 based on the image transformation of the input image 200 and the process may illustratively end in step 375.

Figure 4A:
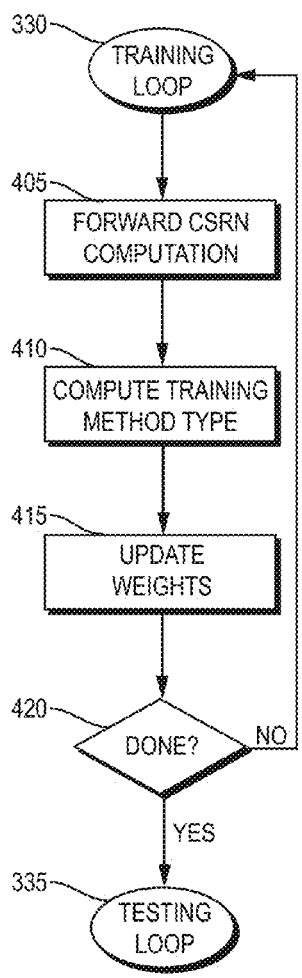
FIGS. 4A-4C show exemplary training, testing, and result flowcharts of the cellular simultaneous recurrent network algorithm of FIG. 3 according to an exemplary embodiment of the present invention.
Figure 4B:
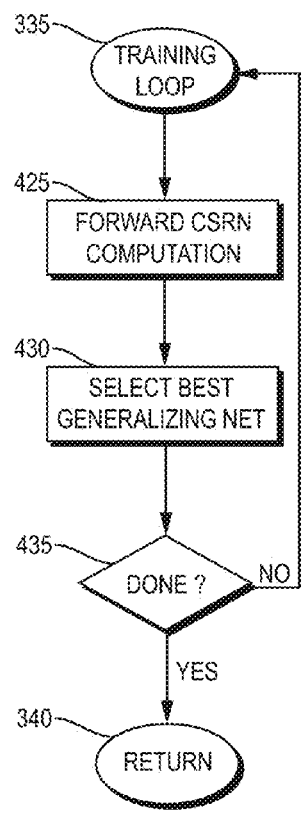
Figure 4C:
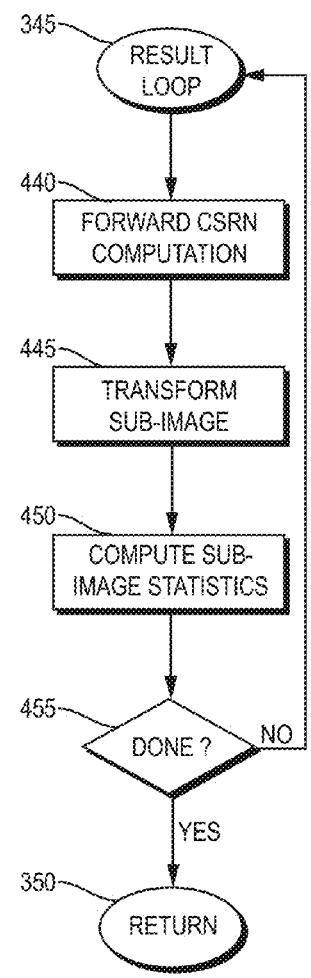

Furthermore, FIGS. 4A-4C show exemplary training, testing, and result loops. The training loop in step 355 of FIG. 3 may include forwarding a computation of the CSRN in step 405 and computing a training method type in step 410. In response to computing the training method type, the weights of the network may be updated in step 415. The training loop may be repeated in step 420 until a determined weight update has been performed and the process may then proceed to the testing loop of step 360. In particular, the testing loop may include forwarding a computation of the CSRN in step 425 and selecting, in step 430, a best generalizing net. The testing loop may be repeated in step 435 until a determined best generalizing net has been selected. The best generalizing net may be defined as a structure that offers optimized (e.g., the best) performance. The process may then return to step 340. The result loop may include forwarding, in step 440, a computation of the CSRN and transforming, in step 445, the sub-image of the input image 200. In step 450, statistics of the sub-image may be computed and the result loop may be repeated in step 455 until a determined statistic has been computed. The process may then proceed to step 350.

Moreover, to adapt the CSRN in the exemplary embodiment of the present invention for specific image processing tasks, a plurality of parameters may be selected. The parameters may include a number and type of external inputs 210, a number of pixels 215 from the input image 200, a number and type of outputs 230 from the network, a core network type, a number of core iterations, a number of neighbor inputs 220, a number of self-recurrent inputs 510, a number of active neurons 905 (e.g., 1 to n), and a training method type.

In particular, the external inputs 210 may be parameters of the function or task to be approximated and may be the location of the cell within the image structure. The pixel inputs 215 from the input image 200 may be for example, one, four, or eight. In addition, the pixel inputs 215 may be the input pixel that corresponds to the cell for pixel operations or geometric transforms. Alternatively, the pixel inputs 215 may be a neighboring window of inputs for spatial filters. As such, in the exemplary embodiments of the present invention, the network core 240 may be a generalized multi-layered perceptron (GMLP), an Elman simultaneous recurrent network (ESRN), or an Elman simultaneous recurrent network with multi-layered feedback (ESRN/mlf). However, the present invention is not limited thereto and the network core may be any known network core known to those skilled in the art. Likewise, the number of core iterations may be the number of internal iterations used for recurrency computations (e.g., 1 to p). In addition, the number of neighboring inputs may be for example, zero, four, or eight. Specifically, when no neighbor inputs 220 are selected, the use of feedback from the neighboring cells is disabled. Accordingly, simultaneous selection of no neighbor inputs 220, no self-recurrent inputs 510, and one core iteration may eliminate recurrency from the CSRN. Furthermore, the training method type may be a method used to train the CSRN to learn an image processing task and may be selected from Extended Kalman Filter (EKF) and Unscented Kalman Filter (UKF).

As is known in the art, an EKF is an estimation technique for nonlinear systems that may be derived by linearizing known linear system Kalman filters. In particular, the EKF expresses the state of the neural network as a stationary process that may be disrupted by noise. Accordingly, the measurement expression of the EKF shows a determined (e.g., a desired) output of the network as a nonlinear function of an input.

Figure 5:
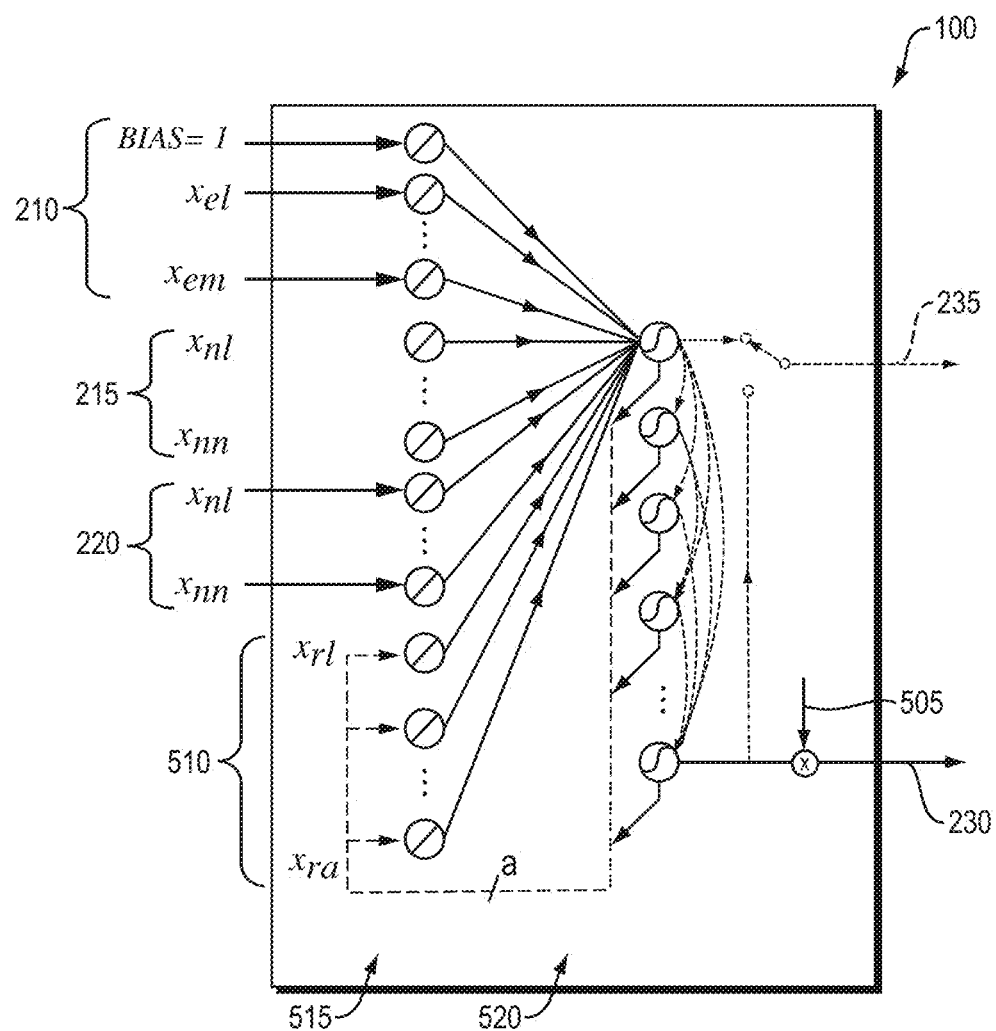
FIG. 5 shows an exemplary generalized multi-layered perceptron core network of an imaging processor according to an exemplary embodiment of the present invention.
Figure 6:
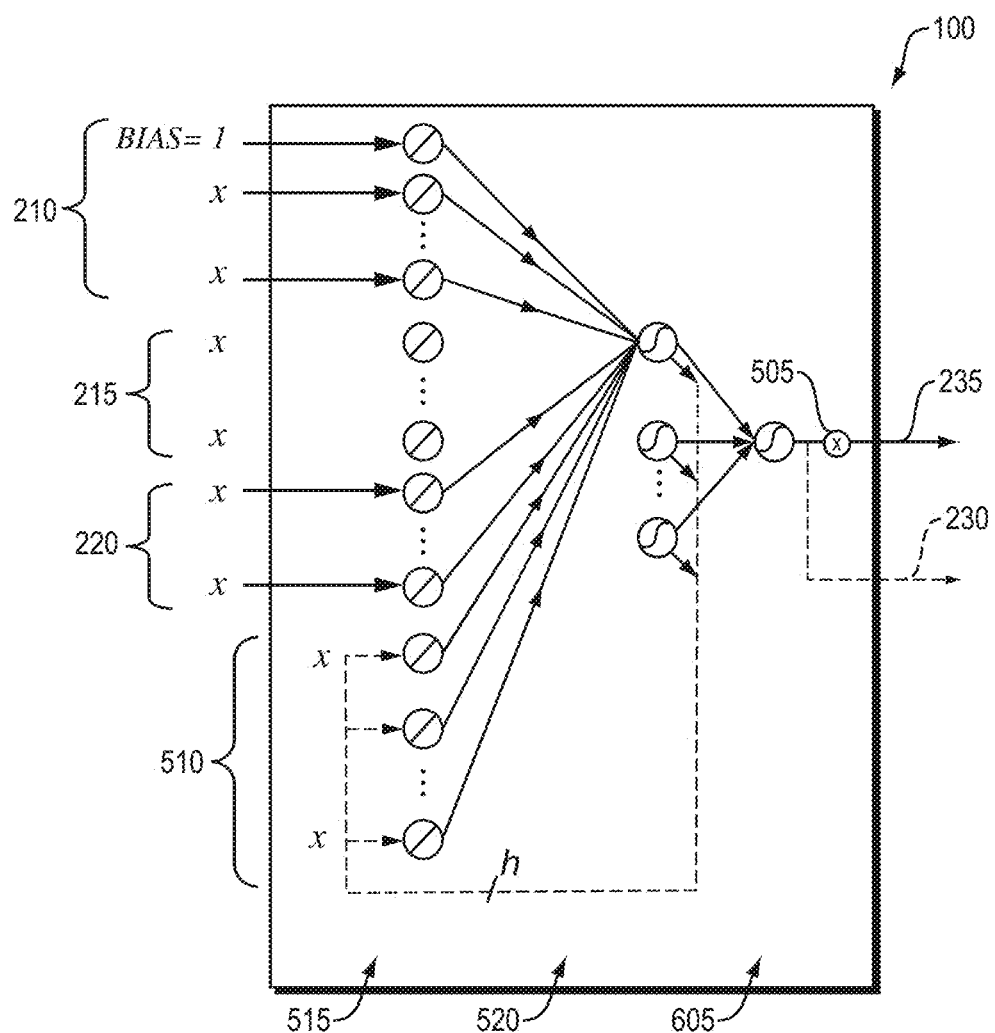
FIG. 6 shows an exemplary Elman simultaneous recurrent network of an imaging processor according to an exemplary embodiment of the present invention.
Figure 7:
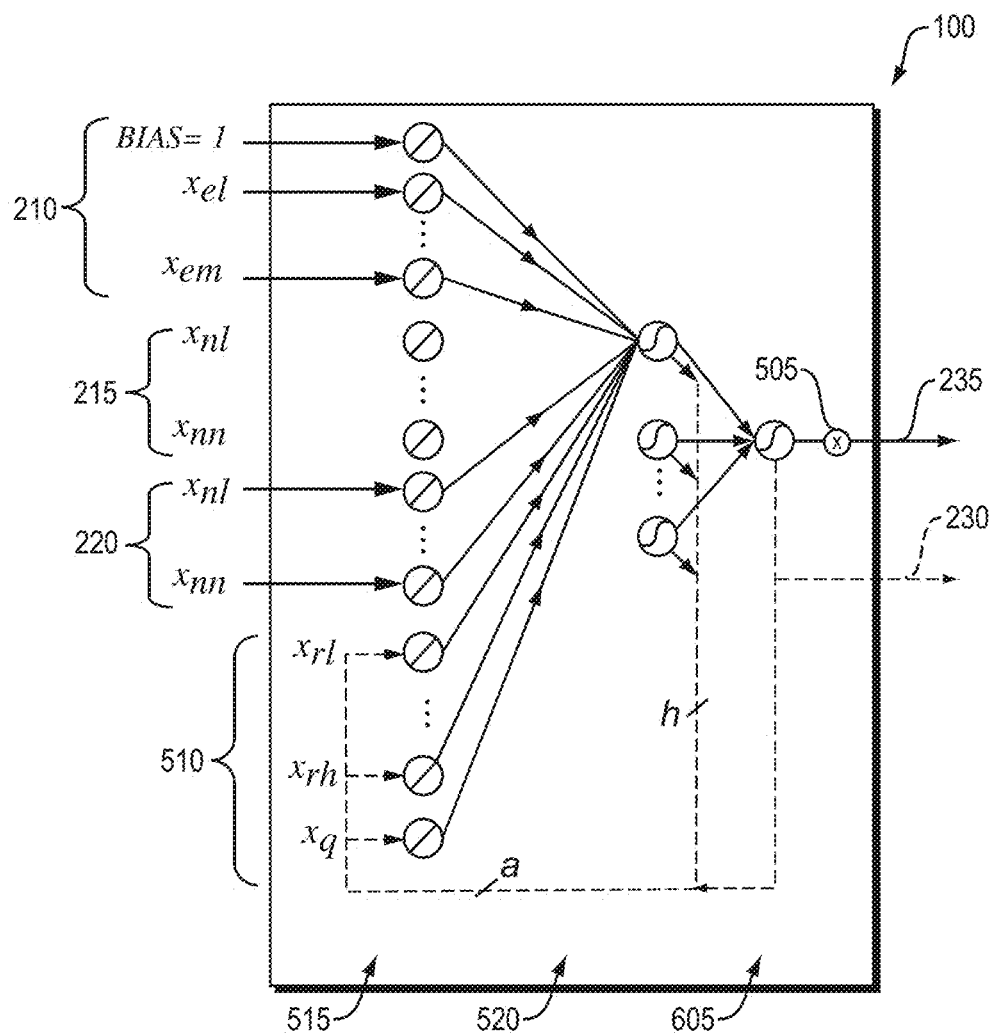
FIG. 7 shows an exemplary Elman simultaneous recurrent network with multi-layered feedback of an imaging processor according to an exemplary embodiment of the present invention.

For example, the networking cores 240 shown in FIGS. 5-7 are adapted for the generalized CSRN of the exemplary embodiment of the present invention. In particular, FIG. 5 shows an exemplary GMLP core network and shows that the core 240 may have a bias input 205, m external inputs 210, n neighbor inputs 220, a self-recurrent input 510, h hidden nodes, and q output nodes. Therefore, a total of a=h+q active nodes may be seen in the GMLP core. The arrowed lines shown from the input nodes 515 to the hidden/output nodes 520 and the lines between the hidden/output nodes 520 may represent the network weights 505. In addition, the active nodes may be fully connected, that is, may receive inputs from all the preceding nodes. FIG. 6, on the other hand, shows an exemplary ESRN core network that may include a bias input 205, m external inputs 210, 8 pixel inputs 215, n neighbor inputs 220, h self-recurrent inputs 510, h hidden nodes, q=1 for the output nodes and an output layer 605. Therefore, a total of a=h+q actives nodes (n) may be seen in the ESRN core. The arrowed lines shown between the input layer, the hidden layer, and the output layer may represent the network weights 505. Lastly, FIG. 7 shows an exemplary ESRN/mlf core that may include a bias input 205, m external inputs 210, 8 pixel inputs 215, n neighbor inputs 220, h self-recurrent inputs 510, h hidden nodes, and q=1 output nodes. Therefore, a total of a=h+q active nodes may be seen in the ESRN/mlf core. The dashed lines in FIGS. 5-7 represent feedback paths. In particular, in FIG. 7, feedback may be used from both the hidden and output layers of the network.

The algorithm for the training method types will now be described. FIGS. 8A and 8B show exemplary algorithms for the training method types. Specifically, FIG. 8A shows an exemplary algorithm for the EKF training method type. The exemplary EKF algorithm may include randomly selecting a set of one or more initial weights of the network and computing an initial covariance matrix, K. For each sub-image (e.g., for each epoch or training loop) the output 230 (e.g., cell output) of the network may be computed and an innovation may be computed. This innovation may be, for example, the error between the target output and the network output. In addition, the algorithm may include utilizing back propagation (BPTT) to compute a Jacobian matrix and then adding a row to the Jacobian matrix. Lastly, the weights of the network may be adapted using EKF equations based on the Jacobian matrix.

FIG. 8B shows an exemplary UKF algorithm that may include randomly selecting a set of one or more initial weights $w_0$ of the network, whereby $\mu_{k-1}^w = w_0$, with $\mu_t^w$ being the mean, and computing an initial covariance matrix $P_0^w$, whereby $P_{k-1}^w = P_0^w$.

Then, for each of the plurality of sub-images (e.g., for each epoch or training loop), a prediction step may be performed and a plurality of sigma points may be selected. Based on the selected sigma points, one or more sigma point weights may be computed and a measurement update may be performed. That is, the forward computation of the CSRN may be computed. Then, the statistics for the update may be computed and the Kalman gain may be computed therefrom. In response to computing the Kalman gain, an estimation update may be performed. Accordingly, to determine whether the image processing tasks may be learned by the CSRN, a plurality of tests may be performed using the generalized image processor. Specifically, grey-scale to binary transformation (e.g., pixel level transformation), low-pass filtering (e.g., filtering), affine transformation (e.g., linear geometric transformation), and rigid body image registration (e.g., non-linear geometric transformation) was tested as will be described herein below.

Figure 9A:
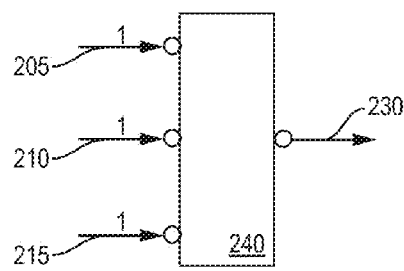
FIGS. 9A-9C show exemplary views of a grey-scale to binary conversion according to an exemplary embodiment of the present invention.
Figure 9B:
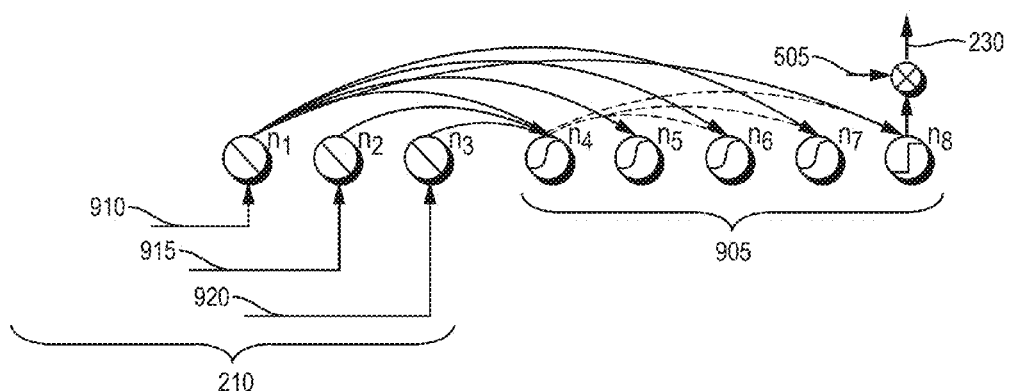
Figure 9C:
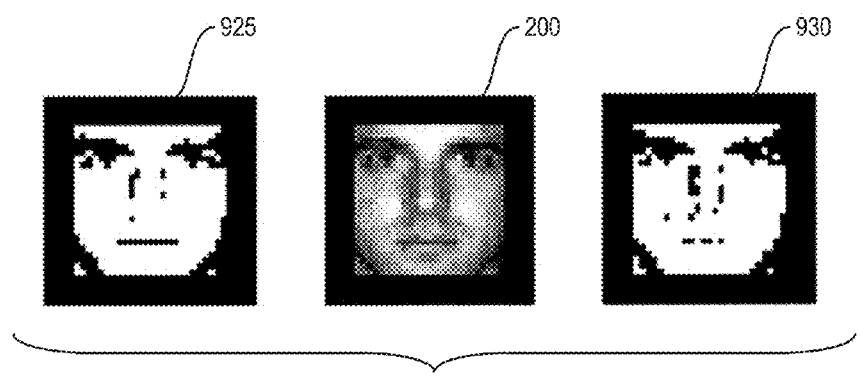

FIG. 9A shows an exemplary CSRN architecture scaled down to implement the grey-scale to binary transformation. In particular, FIG. 9A shows that a bias input was used ($X_1$=bias=1; 910), an external input of θ=1 (single external input, threshold parameter), and a pixel input of i=1 were used. The single pixel input corresponds to the pixel value of the cell. Based on the configuration as shown in FIG. 9A, FIG. 9B shows the output results $X_2$=threshold (filter parameter) 915 and $X_3$=pixel intensity 920. Specifically, the core network may have, for example, five active neurons 905 and three inputs in the present invention. In addition, no neighbor 220 or self-recurrent inputs 510 have to be used and the number of core iterations may be set to one. The scaling weight 505 was set to $W_s$=1 and the network used, for example, eight nodes in total. Using the image processor architecture and the core configuration of this experiment grey-scale to binary conversion was able to be performed on an input image 200 based on a generated target image 925. As shown in FIG. 9C, the network was capable of producing a final $IM_{ACC}$=98.3% and an $IM_{CR}$=96.4%. Therefore, the results in FIG. 9C show that the CSRN was capable of learning the grey-scale to binary conversion and outputting (e.g., ˆY) an output image 930 substantially similar to the generated target image 925. Here, $IM_{ACC}$ represents the percentage of matching pixels between the target image and the output image, and $IM_{CP}$ represents the correlation ratio between the target image and the output image.

Figure 10A:
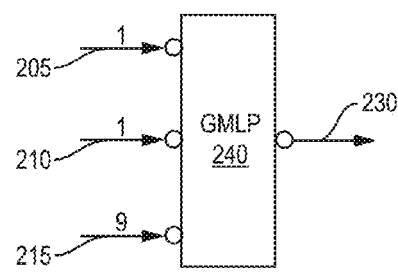
FIGS. 10A-10C show exemplary views of average filtering according to an exemplary embodiment of the present invention.
Figure 10B:
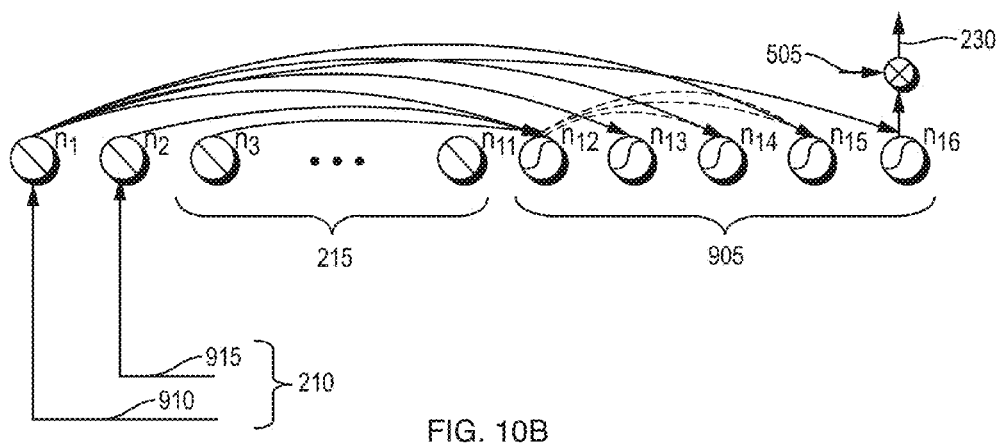
Figure 10C:
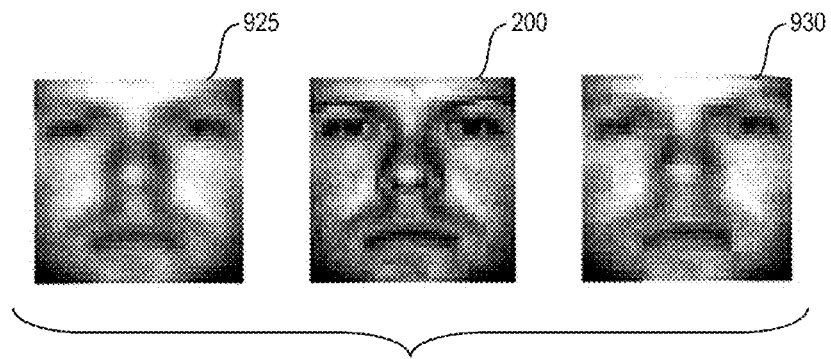

Furthermore, FIG. 10A shows the generalized CSRN architecture as adapted for implementing low-pass filtering (e.g., average filtering). The corresponding network core for this experiment is shown in FIG. 10B. As shown in FIGS. 10A and 10B, one bias input 205, one external input 210, and nine pixel inputs 215 were used. In particular, FIG. 10B shows that sixteen neurons were used and five of those neurons were active neurons 905 and the external inputs 210 are shown as $X_2$ and $X_1$. The results output using the CSRN architecture and the core network are shown in FIG. 10C. The output results show that a final $IM_{MSE}$=5.0E-04 and $IM_{CR}$=98.2%. Here, $IM_{MSE}$ represents the mean squared error (MSE) between the target image and output image, and $IM_{CP}$ represents the correlation ratio between the target image and the output image.

Figure 11A:
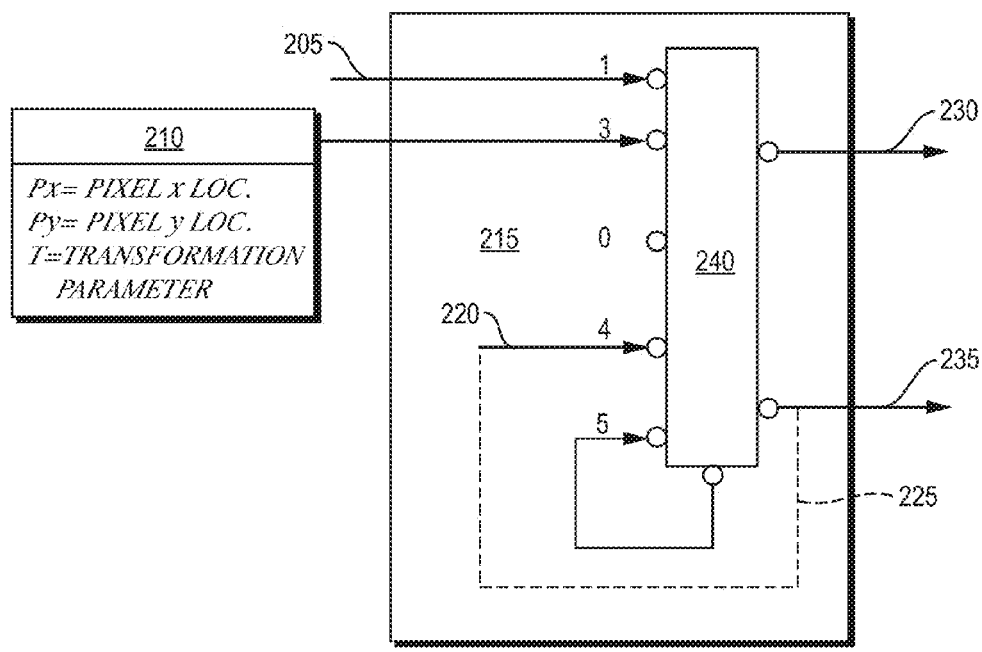
Figure 11B:
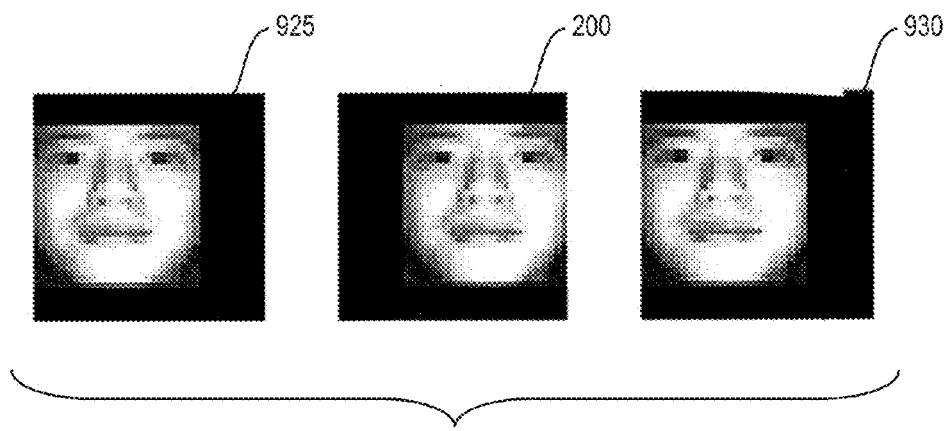
Figure 11C:
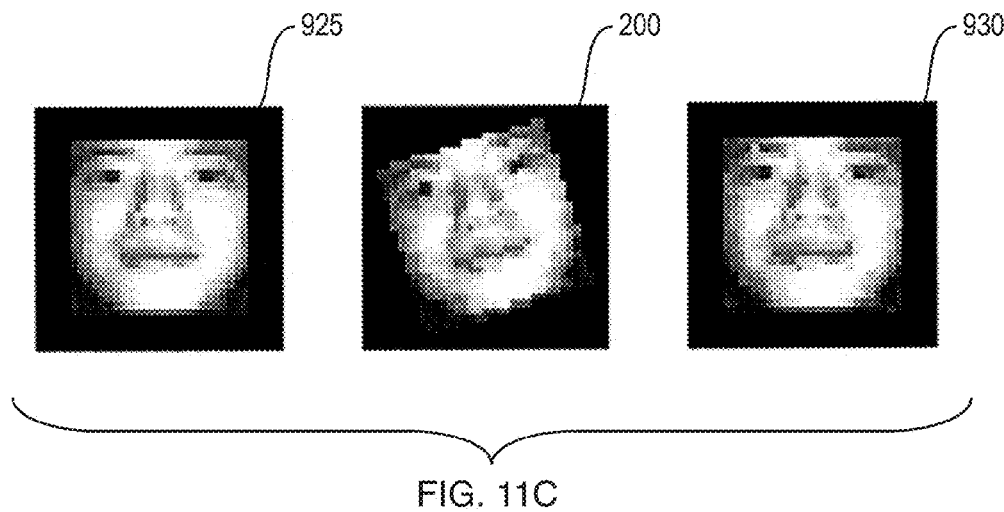
Figure 11D:
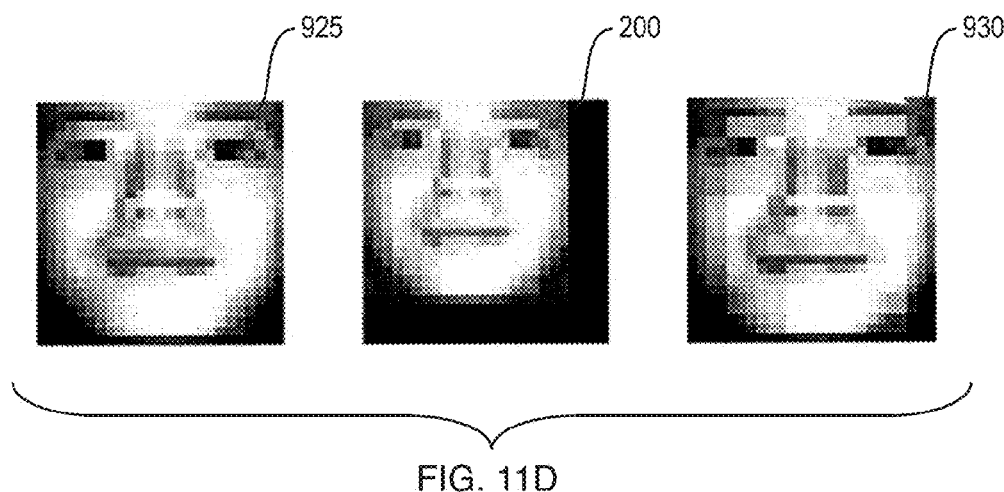

Another experiment was performed for affine transformation and the generalized CSRN architecture is shown in FIG. 11A and the corresponding network is the same network as shown in FIG. 5. In particular FIG. 11A shows that one bias input 205 was used, three external inputs 210, zero pixel inputs 215, four neighbor inputs 220, and five recurrent inputs 225 were used. In addition, the core network was connected to eight neighboring cells by a connector 235 (Q). FIGS. 11B-11D show results for translation, rotation, and scaling based on the architecture of FIG. 11A and the core network of FIG. 5. As shown in FIG. 11B, the results of the affine translation test for θ=10 pixels showed $J_{ACC}$=100% and $IM_{CR}$=100%. In addition, as shown in FIG. 11C, the results of the affine rotation test for θ'=16° showed $J_{ACC}$=96.83% and $IM_{CR}$=100%. Lastly, as shown in FIG. 11D, the results of the affine scaling test for θ'=0.84 showed $J_{ACC}$=68.3% and $IM_{CR}$=96.8%. Here, $J_{ACC}$ represents the percentage of cell outputs which exactly match known target function values, and $IM_{CP}$ represents the correlation ratio between the target image and the output image.

In addition, FIG. 11E shows the results of affine transformation for larger image sizes for the rotation experiment only. In particular, image results of the target image 925, input image 200, and output image 930 are shown for θ'=16° for image sizes of 35 by 35 cm, 75 by 75 cm, and 125 by 125 cm.

Figure 12A:
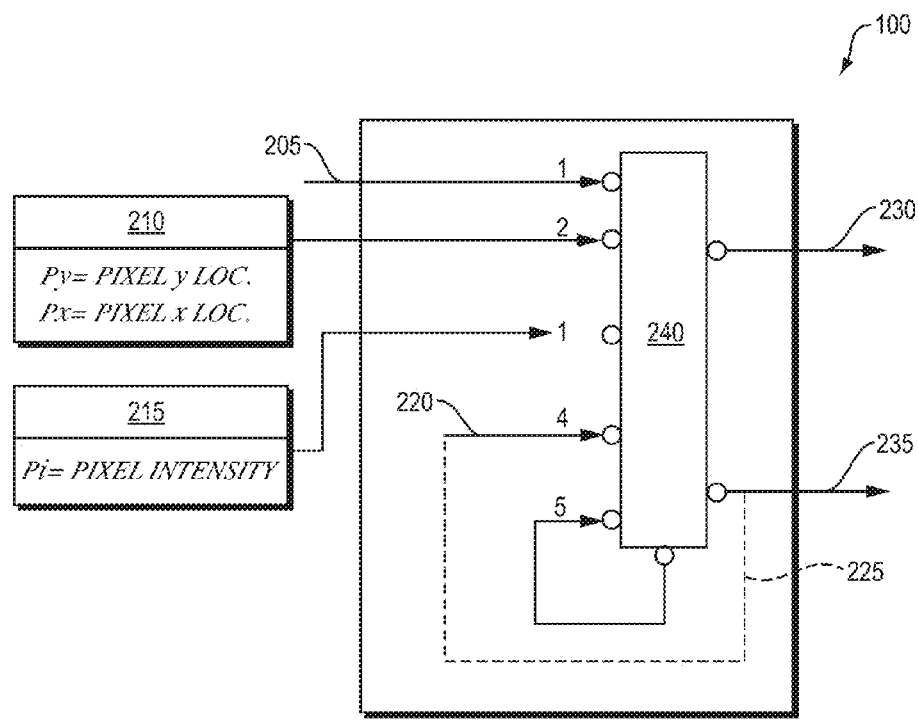
FIGS. 12A-12C show exemplary views of affine transformation for rigid-body assumption according to an exemplary embodiment of the present invention.
Figure 12B:
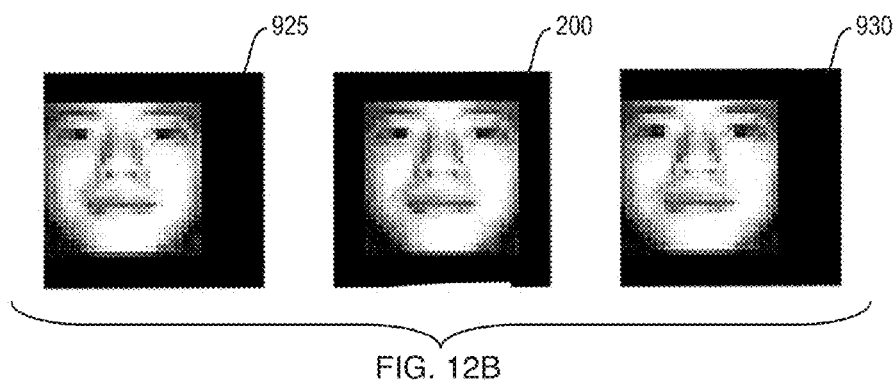
Figure 12C:
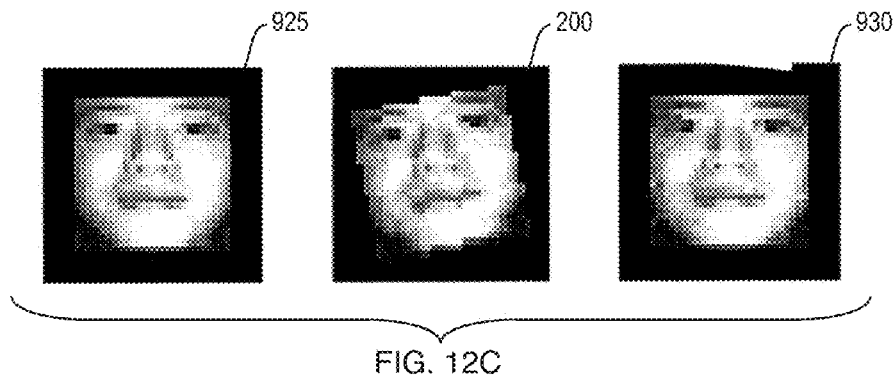

Moreover, the generalized CSRN architecture may be configured to implement image registration (e.g., rigid-body assumption) as shown in FIGS. 12A-12C. The corresponding network for this affine transformation is that shown in FIG. 5. As shown in FIG. 12A, one bias input 205 was used, two external inputs 210, one pixel input 215, four neighbor inputs 220, and five recurrent inputs 225 were used. In addition, the core may be connected by the connector 235 (Q) to eight neighboring cells. As shown in FIG. 12B, the results of the image processing of a grey-scale image under affine translation for θ'=5 pixels showed $J_{ACC}$=100% and $IM_{CR}$=1.0. In addition, as shown in FIG. 12C, the results of the image registration for θ'=10° showed $J_{ACC}$=88.7% and $IM_{CR}$=1.0. Here, $J_{ACC}$ represents the percentage of cell outputs which exactly match known target function values, and $IM_{CR}$ represents the correlation ratio between the target image and the output image.

The image processor of the present invention is capable of learning to perform basic image processing tasks as well as more complex tasks involved in geometric transformation. In particular, the image processor of the present invention is capable of performing image processing tasks that have previously been a challenge such as affine transformations and image registration. Thus, by computing weights of the CSRN using a learning process, the image processor of the present invention may perform more complex imaging processing tasks and may show a lower rate of error for basic image processing tasks.

The foregoing description has been directed to specific embodiments. It will be apparent; however, that other variations and modifications may be made to the described embodiments, with the attainment of some or all of their advantages. Accordingly, this description is to be taken only by way of example and not to otherwise limit the scope of the embodiments herein. Therefore, it is the object of the accompanying claims to cover all such variations and modifications as come within the true scope of the embodiments herein.

What is claimed is:

1. An image processing method, comprising:
setting, by a processor, one or more initial parameters of a cellular simultaneous recurrent network (CSRN);
generating, by the processor, a target image based on the one or more initial parameters;
executing, by the processor, a training process for training the CSRN to learn an image processing task based on the generated target image, wherein the training process performs the image processing task on one of a plurality of sub-images of an input image;
storing, on a storage device, one of the plurality of the sub-images of the input image;
performing, by the processor, the training process until the image processing task has been performed on each of the plurality of sub-images of the input image; and performing, by the processor, an image transformation on the input image after the training process for training the CSRN is complete to generate an output image which is correlated to the generated target image,
wherein the executing of the training process includes:
creating, by the processor, a CSRN object by setting one or more random initial weights,
performing, by the processor, a testing loop based on the CSRN object,
performing, by the processor, a testing loop based on the CSRN object, and
performing, by the processor, a result loop of the tested CSRN object when the testing loop is completed.

2. The method of claim 1, wherein the training loop includes:
forwarding, by the processor, a computational load of the CSRN;
computing, by the processor, a training method type;
updating, by the processor, one or more weight parameters; and
repeating, by the processor, the training loop for each of the plurality of sub-images.

3. The method of claim 1, wherein the testing loop includes:
forwarding, by the processor, a computation of the CSRN;
selecting, by the processor, a best generalizing net; and
repeating, by the processor, the testing loop for each of the plurality of sub-images.

4. The method of claim 1, wherein the result loop includes:
forwarding, by the processor, a computation of the CSRN;
transforming, by the processor, one of the plurality of sub-images;
computing, by the processor, statistics of one of the plurality of sub-images; and
repeating, by the processor, the result loop for each of the plurality of sub-images.

5. The method of claim 1, wherein the one or more parameters are selected from one or more of a group consisting of: a number and type of external inputs, a number of pixels from the input image, a number and type of outputs for the network, a core network type, a number of core iterations, a number of neighbor inputs, a number of self-recurrent inputs, a number of active neurons, and a training method type.

6. The method of claim 5, wherein a core network type is selected from a group consisting of: generalized multi-layered perceptron, Elman simultaneous recurrent network, and Elman simultaneous recurrent network with multi-layered feedback.

7. The method of claim 5, wherein the training method type is selected from a group consisting of an Extended Kalman Filter (EKF) and an Unscented Kalman Filter (UKF).

8. The method of claim 7, wherein the EKF training method is an algorithm that includes:
randomly selecting, by the processor, a set of one or more initial weights;
computing, by the processor, an initial covariance matrix for each of a plurality of sub-images;
computing, by the processor, an error between a target output and the network outputs;
computing, by the processor, a Jacobian matrix using back propagation (BPTT);
adding, by the processor, a row to the Jacobian matrix; and
adapting, by the processor, the weights using EKF equations.

9. The method of claim 7, wherein the UKF training method is an algorithm that includes:
randomly selecting, by the processor, a set of one or more initial weights;
computing, by the processor, an initial covariance matrix;
performing, by the processor, a prediction step for each of a plurality of sub-images;
selecting, by the processor, a plurality of sigma points;
computing, by the processor, one or more sigma point weights based on the selected sigma points;
performing, by the processor, a measurement update by computing a forward computation of the CSRN;
computing, by the processor, statistics of the measurement update;
computing, by the processor, a Kalman gain based on the computed statistics; and
performing, by the processor, an estimate update based on the Kalman gain.

10. An image processing system, comprising:
a memory configured to store program instructions; and
a processor configured to execute the program instructions, which when executed cause the processor to:
set one or more initial parameters of a cellular simultaneous recurrent network (CSRN);
generate a target image based on the one or more initial parameters;
execute a training process for training the CSRN to learn an image processing task based on the generated target image, wherein the training process performs the image processing task on one of a plurality of sub-images of an input image;
store one of the plurality of sub-images of the input image in the memory;
perform the training process until the image processing task has been performed on each of the plurality of sub-images of the input image; and
perform an image transformation on the input image after the training process for training the CSRN is complete to generate an output image which is correlated to the generated target image,
wherein when the training process is executed, the processor is further caused to:
create a CSRN object by setting one or more random initial weights,
perform a training loop based on the CSRN object,
perform a training loop based on the CSRN object, and
perform a result loop of the tested CSRN object when the testing loop is completed.

11. The image processing system of claim 10, wherein when the training loop is performed, the processor is further caused to:
forward a computation of the CSRN;
compute a training method type;
update one or more weight parameters; and
repeat the training loop for each of the plurality of sub-images.

12. The image processing system of claim 10, wherein when the testing loop is performed, the processor is further caused to:
forward a computation of the CSRN;
select a best generalizing net; and
repeat the testing loop for each of the plurality of sub-images.

13. The image processing system of claim 10, wherein when the result loop is performed, the processor is further caused to:
 forward a computation of the CSRN;
 transform one of the plurality of sub-images;
 compute statistics of one of the plurality of sub-images; and
 repeat the result loop for each of the plurality of sub-images.

14. The image processing system of claim 10, wherein the one or more parameters are selected from one or more of a group consisting of: a number and type of external inputs, a number of pixels from the input image, a number and type of outputs for the network, a core network type, a number of core iterations, a number of neighbor inputs, a number of self-recurrent inputs, a number of active neurons, and a training method type.

15. The image processing system of claim 14, wherein a core network type is selected from a group consisting of: generalized multi-layered perceptron, Elman simultaneous recurrent network, and Elman simultaneous recurrent network with multi-layered feedback.

16. The image processing system of claim 14, wherein the training method type is selected from a group consisting of an Extended Kalman Filter (EKF) and an Unscented Kalman Filter (UKF).

17. The image processing system of claim 16, wherein when the EKF training method is executed, the processor is further caused to:
 randomly select a set of one or more initial weights;
 compute an initial covariance matrix for each of the plurality of sub-images;
 compute an error between a target output and the network outputs;
 compute a Jacobian matrix using back propagation (BPTT);
 add a row to the Jacobian matrix; and
 adapt the weights using EKF equations.

18. The image processing system of claim 16, wherein when the UKF training method is executed, the processor is further caused to:
 randomly select a set of one or more initial weights;
 compute an initial covariance matrix;
 perform a prediction step for each of the plurality of sub-images;
 select a plurality of sigma points;
 compute one or more sigma point weights based on the selected sigma points;
 perform a measurement update by computing a forward computation of the CSRN;
 compute statistics of the measurement update;
 compute a Kalman gain based on the computed statistics; and
 perform an estimate update based on the Kalman gain.

19. A non-transitory computer readable medium storing program instructions executed by a processor, the program instructions comprising:
 program instructions that set one or more initial parameters of a cellular simultaneous recurrent network (CSRN);
 program instructions that generate a target image based on the one or more initial parameters;
 program instructions that execute a training process for training the CSRN to learn an image processing task based on the generated target image, wherein the training process performs the image processing task on one of a plurality of sub-images of an input image;
 program instructions that store one of the plurality of sub-images of the input image in the memory;
 program instructions that perform the training process until the image processing task has been performed on each of the plurality of sub-images of the input image; and
 program instructions that perform an image transformation on the input image after the training process for training the CSRN is complete to generate an output image which is correlated to the generated target image,
 wherein the program instructions that execute the training process include:
  program instructions that create a CSRN object by setting one or more random initial weights,
  program instructions that perform a training loop based on the CSRN object,
  program instructions that perform a testing loop based on the CSRN object, and
  program instructions that perform a result loop of the tested CSRN object when the testing loop is completed.

20. The non-transitory computer readable medium of claim 19, loop include:
 program instructions that forward a computational load of the CSRN;
 program instructions that compute a training method type;
 program instructions that update one or more weight parameters; and
 program instructions that repeat the training loop for each of the plurality of sub-images.

21. The non-transitory computer readable medium of claim 19, wherein the program instructions that perform the testing loop include:
 program instructions that forward a computation of the CSRN;
 program instructions that select a best generalizing net; and
 program instructions that repeat the testing loop for each of the plurality of sub-images.

22. The non-transitory computer readable medium of claim 19, wherein the program instructions that perform the result loop include:
 program instructions that forward a computation of the CSRN;
 program instructions that transform one of the plurality of sub-images;
 program instructions that compute statistics of one of the plurality of sub-images; and
 program instructions that repeat the result loop for each of the plurality of sub-images.

* * * * *